(12) United States Patent
Rigby et al.

(10) Patent No.: US 7,811,955 B2
(45) Date of Patent: Oct. 12, 2010

(54) METHOD OF REGENERATING A CATALYST

(75) Inventors: Lee Rigby, Richmond, KY (US); R. Merritt Sink, Lake Jackson, TX (US)

(73) Assignee: BASF SF, Ludwigshafen (DE)

( * ) Notice: Subject to any disclaimer, the term of this patent is extended or adjusted under 35 U.S.C. 154(b) by 784 days.

(21) Appl. No.: 11/719,056

(22) PCT Filed: Nov. 10, 2005

(86) PCT No.: PCT/EP2005/012079

§ 371 (c)(1),
(2), (4) Date: May 10, 2007

(87) PCT Pub. No.: WO2006/050962

PCT Pub. Date: May 18, 2006

(65) Prior Publication Data

US 2007/0293389 A1    Dec. 20, 2007

Related U.S. Application Data

(63) Continuation of application No. 10/985,103, filed on Nov. 10, 2004, now abandoned.

(51) Int. Cl.
*B01J 38/52* (2006.01)

(52) U.S. Cl. .............................. 502/33; 502/28; 502/514

(58) Field of Classification Search ............... 502/27, 502/28, 33, 514

See application file for complete search history.

(56) References Cited

U.S. PATENT DOCUMENTS

| 2,787,540 A | 4/1957 | Appell |
| 3,060,133 A | 10/1962 | Jockers et al. |
| 3,966,635 A | 6/1976 | El-Ghatta et al. |
| 4,659,683 A | 4/1987 | Biffar et al. |

FOREIGN PATENT DOCUMENTS

GB    1197619    7/1970

*Primary Examiner*—Edward M Johnson
(74) *Attorney, Agent, or Firm*—Connolly Bove Lodge & Hutz LLP

(57) ABSTRACT

Platinum is applied on a carrier such as graphite to form a platinum catalyst. The catalyst becomes poisoned with a metal as a result of use of the catalyst in preparation of hydroxylammonium salts. A method of regenerating the catalyst dissolves the platinum and the metal in an acid. The method also adds ammonium sulfate to the acid to precipitate the platinum. The ammonium sulfate is a by-product of a commercial process to synthesize a caprolactam. Also, the method precipitates the platinum onto the carrier for reuse in the preparation of the hydroxylammonium salts and in preparation of the caprolactam.

28 Claims, 3 Drawing Sheets

METHOD OF REGENERATING A CATALYST

This application is a National Phase of International Application No. PCT/EP2005/012079 filed on Nov. 10, 2005, which claims priority to application Ser. No. 10/985,103 filed in United States on Nov. 10, 2004 under 35 U.S.C. §119; the entire contents of all are hereby incorporated by reference.

FIELD OF THE INVENTION

The subject invention generally relates to a method of regenerating a catalyst and a method of preparing hydroxylammonium salts. More specifically, the subject invention relates to using ammonium sulfate in a preparation of the catalyst from an acid.

DESCRIPTION OF THE RELATED ART

Catalysts are known in the art. Typically, catalysts are used in commercial processes in preparation of hydroxylammonium salts. A specific catalyst includes platinum applied on a carrier. If the platinum is applied on the carrier and used in manufacturing of hydroxylammonium salts, the catalyst may become at least partially poisoned with a metal. The metal is typically a transition metal such as mercury or copper. In rare occurrences, the catalyst may become extensively poisoned as a result of extensive impurities in raw materials used to make the hydroxylammonium salts. As a result of poisoning, the catalyst must be regenerated to remain effective. Methods of regenerating catalysts are also known in the art.

There are various prior art methods of regenerating catalysts, specifically catalysts that include platinum applied on the carrier. A first type of prior art method includes precipitation of the platinum from an acid with metallic or organic compounds. A second type of prior art method includes precipitation of the metal that poisons the catalyst from an acid using organic compounds. A third type of prior art method includes dissolving the platinum and the metal that poisons the catalyst in acid and subsequently precipitating the platinum onto the carrier.

The first and second types of prior art methods of regenerating catalysts, as described above, utilize metallic or organic compounds such as aluminum or hydrazine to precipitate the platinum or the metal that poisons the catalyst. All of the prior art methods of regenerating catalysts, as described above, are deficient due to their inability to effectively separate the metal poisoning the catalyst from the platinum.

U.S. Pat. No. 2,787,540 to Appell discloses a prior art method of regenerating catalysts which is representative of the first type of prior art method described above. The '540 patent discloses dissolving platinum and a metal that poisons the catalyst in acid. The '540 patent further discloses selectively precipitating the platinum from the acid with hydrazine hydrate or metals such as aluminum, zinc, and magnesium. Yet, the '540 patent discloses that using the metals such as aluminum, zinc, and magnesium is undesirable when high purity of the platinum is required. There is no teaching or suggestion of using a readily available and relatively inexpensive non-metallic inorganic ammonium salt such as ammonium sulfate to precipitate the platinum. Specifically, the '540 patent does not disclose the use of ammonium sulfate or any plentiful by-product of a commercial process to precipitate the platinum. Therefore, the '540 patent does not disclose a cost efficient method of regenerating the catalyst using a non-metallic inorganic salt. Thus, the method disclosed in the '540 patent is not effective for use in commercial processes such as synthesis of caprolactam.

One prior art method of regenerating catalysts, which is representative of the second type of prior art method described above, is disclosed in U.S. Pat. No. 4,659,683 to Biffar et al. The '683 patent discloses dissolving platinum and a metal that poisons the catalyst in dilute nitric acid, followed by precipitation of the metal that poisons the catalyst with organic quinolines, carbazones, and quinaldine. The '683 patent does not disclose precipitation of the platinum as an insoluble salt or use of ammonium sulfate to precipitate the platinum or the metal that poisons the catalyst. Therefore, the '683 patent does not disclose a cost efficient method of regenerating the catalyst. Thus, the method disclosed in the '683 patent is not effective for use in commercial processes such as the synthesis of caprolactam and ammonium sulfate.

An additional prior art method of regenerating catalysts, which is representative of the third type of prior art method described above, is disclosed in U.S. Pat. No. 3,060,133 to Jockers et al. The '133 patent discloses platinum applied on a carrier and a metal that poisons the catalyst. The '133 patent also discloses dissolving the platinum and the metal that poisons the catalyst in acid. Following dissolution in acid, the '133 patent discloses a reduction of the platinum in the acid with addition of sulfur containing compounds to the acid. The platinum is then precipitated onto the carrier with formic acid, sodium formate, or calcium formate. The '133 patent does not disclose precipitation of the platinum as an insoluble salt from the acid or use of ammonium sulfate to precipitate the platinum as an insoluble salt. Thus, the '133 patent does not disclose a cost efficient method for effectively separating the platinum from the metal that poisons the catalyst.

Because the '133 patent precipitates the platinum onto the carrier after dissolution in the acid, it is likely that the method disclosed in the '133 patent also precipitates the metal that poisons the catalyst back onto the carrier. Any precipitation of the metal that poisons the catalyst back onto the carrier would reduce the efficiency of the method. Therefore, the '133 patent does not disclose an effective separation of the platinum or a method that is effective for use in commercial processes such as synthesis of caprolactam and ammonium sulfate.

The prior art methods of regenerating catalysts, as described immediately above have not been optimized for cost efficiency in commercial processes. The prior art methods are not suitable for use in commercial processes for various reasons. For example, because the prior art methods require the separate purchase of metallic or organic compounds to precipitate the platinum or the metal that poisons the catalyst, industrial production costs are increased. Also, a lack of precipitating the platinum as an insoluble salt from the acid, evidenced in the '133 patent, does not effectively separate the platinum from the metal that poisons the catalyst. Not effectively separating the platinum from any metal poisoning the catalyst allows for precipitation of the metal that poisons the catalyst back onto the carrier. Any such precipitation would not efficiently regenerate the catalyst and would not be suitable for use in commercial processes.

SUMMARY OF THE INVENTION AND ADVANTAGES

The subject invention provides a method of regenerating a catalyst having platinum applied on a carrier. The catalyst is at least partially poisoned with a metal. The catalyst becomes at least partially poisoned as a result of use in preparation of hydroxylammonium salts. The method includes dissolving the platinum and the metal in a first acid. The method also includes adding ammonium sulfate to the first acid to precipitate the platinum. The method further includes precipitating the platinum onto the carrier for reuse.

The subject method also provides a method of preparing hydroxylammonium salts. The catalyst which, as described above, has been regenerated by precipitation of the platinum with ammonium sulfate is used to prepare the hydroxylammonium salts.

The methods of regenerating the catalyst and preparing the hydroxylammonium salts are used to decrease industrial production costs. Specifically, the methods are most often used when extensive poisoning of the catalyst has occurred due to extensive impurities in raw materials used to create the hydroxylammonium salts, however the methods can be used whenever any poisoning has occurred. The methods utilize ammonium sulfate, a plentiful by-product of caprolactam synthesis, to regenerate the catalyst for use in efficient production of hydroxylammonium salts, specifically, hydroxylamine. The use of ammonium sulfate improves a time of regeneration of the catalyst and limits a loss of production of hydroxylamine due to poisoning of the catalyst, thus saving overall production costs due to a potential loss of caprolactam.

The methods of regenerating the catalyst and preparing hydroxylammonium salts, according to the present invention, also yield additional advantages. A first additional advantage includes reducing an amount of the metal that poisons the catalyst. A second additional advantage includes reducing an amount of the platinum leftover in solution after precipitation of the platinum with ammonium sulfate. A third additional advantage includes recovering the metal that poisons the catalyst from the filtrate and recovering any leftover platinum. This reduces an amount of waste transferred to the environment when a filtrate is discarded and when the platinum is reclaimed.

DETAILED DESCRIPTION OF A PREFERRED EMBODIMENT

Figure 1:
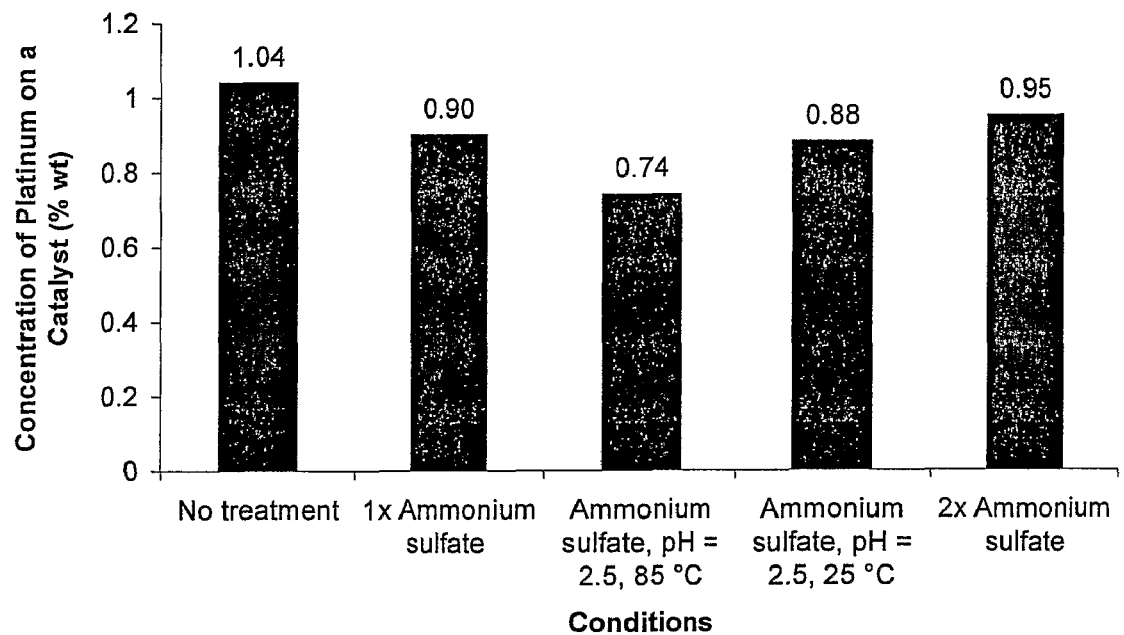
FIG. 1 is a bar graph illustrating concentration of platinum on a catalyst using various ammonium sulfate regeneration procedures.

A method of regenerating a catalyst having platinum applied on a carrier is provided and described additionally below. The method of the present invention is used to improve manufacturing reliability and decrease industrial production costs associated with preparation of hydroxylammonium salts. The method is typically utilized when extensive poisoning of the catalyst has occurred due to extensive impurities in raw materials used to create the hydroxylammonium salts, however the method can be used whenever any poisoning has occurred. The method utilizes a plentiful by-product of a commercial process also described additionally below. Most preferably, the method regenerates the catalyst for use in efficient production of hydroxylamine. But, hydroxylamine can be produced via a variety of processes and methods.

Specifically, hydroxylamine can be formed as a hydroxylammonium salt. A method of preparing hydroxylammonium salts includes using the catalyst having platinum applied on the carrier that has been regenerated by precipitation of the platinum with ammonium sulfate.

The method of preparing hydroxylammonium salts may also include the step of reacting nitric oxide and hydrogen in the presence of the catalyst. If the nitric oxide is reacted with the hydrogen, the nitric oxide is preferably gaseous and preferably reacted in an amount of from 5.0 to 40.0, more preferably of from 15.0 to 40.0, and most preferably of from 25.0 to 35.0 percent by volume per 100 percent by volume. Also, if the nitric oxide is reacted with the hydrogen, the hydrogen is preferably gaseous and preferably reacted in an amount of from 10.0 to 80.0, more preferably of from 35.0 to 80.0, and most preferably of from 65.0 to 75.0 percent by volume per 100 percent by volume.

The method of preparing hydroxylammonlum salts may also include the step of suspending the catalyst in a processing acid. If the catalyst is suspended in a processing acid, the processing acid includes, but is not limited to, a mineral acid. Most preferably, the processing acid includes sulfuric acid.

Referring now to the commercial process as introduced above, hydroxylamine is used to synthesize a caprolactam. The commercial process produces ammonium sulfate as a plentiful by-product. A method of preparing the caprolactam includes providing a catalyst that has been regenerated by precipitation of the platinum with ammonium sulfate. It is preferred that the catalyst is provided in an amount of from 10.0 to 60.0, more preferably from 10.0 to 40.0, and most preferably from 10.0 to 30.0 grams per one liter volume of a reactor. The method also includes forming hydroxylamine in the presence of the regenerated catalyst.

Referring now to the method of regenerating the catalyst, as first introduced above, the catalyst is at least partially poisoned with a metal as a result of use in preparation of hydroxylammonium salts. The carrier includes all possible acid-proof substances including, but not limited to, graphite, activated charcoal, and barium sulfate. In the commercial process associated with the present invention, graphite is especially useful and cost effective, and is most preferred. It is contemplated that the metal poisoning the catalyst may include, but is not limited to, mercury, copper, and combinations thereof.

The method includes dissolving the platinum, preferably slurried in water, and the metal in a first acid. Preferably, the first acid includes, but is not limited to, at least one mineral acid. More preferably, the first acid includes a combination of two acids including hydrochloric acid and nitric acid. Other options include, but are not limited to, sulfuric acid, chlorosulfuric acid, hydrobromic acid, hydriodic acid, hydrofluoric acid, perchloric acid, and combinations thereof. Most preferably, the first acid includes aqua regia. Aqua regia is defined as a combination of nitric acid and hydrochloric acid, usually in a volumetric ratio of 1:3. Without intending to be bound by theory, it is believed that aqua regia dissolves the platinum and the metal that poisons the catalyst because, in combination, the nitric acid and the hydrochloric acid perform different functions. The nitric acid, a powerful oxidizer, dissolves a small amount of the platinum and the metal poisoning the catalyst thereby forming platinum ions and metal ions, respectively. The hydrochloric acid provides chloride ions that react with the platinum ions and the metal ions. It is believed that reacting the platinum ions and the metal ions with the chloride ions allows further oxidation of the platinum and the metal to take place, thus increasing dissolution of the platinum and the metal.

The method of regenerating the catalyst may include the step of heating the first acid. If heating is conducted, it is preferred that the first acid is heated after dissolving the platinum and the metal in the first acid. If the first acid is heated, the first acid is preferably heated to from 60 to 100° C. and most preferably to from 80 to 90° C. The method also optionally includes stirring the first acid. If stirring is conducted, it is preferred that stirring the first acid occurs as the first acid is heated. When stirred, the first acid is preferably stirred from 30 minutes to 3.50 hours and most preferably from 1.75 to 2.25 hours.

If the first acid is heated, the first acid, now including the platinum and the metal, is preferably cooled. However, as described above, heating is optional so that cooling may not be necessary. If the first acid is cooled, the first acid is cooled preferably to from 20 to 30° C. and most preferably to from 23 to 27° C.

The method of regenerating the catalyst also includes adding ammonium sulfate to the first acid to precipitate the platinum as a sulfate salt. It is contemplated that other ammonium salts may also be used to precipitate the platinum as the sulfate salt. These other ammonium salts include ammonium nitrate, ammonium perchlorate, ammonium phosphate, and mixtures thereof. The ammonium sulfate is preferably added in an amount of from 50 to 80, more preferably of from 60 to 75, and most preferably of from 65 to 70 parts by weight per 100 parts by weight of the catalyst. Without intending to be bound by theory, it is believed that ammonium ions form a coordinate bond with the platinum to form the sulfate salt.

Alternatively, the first acid may be stirred after the ammonium sulfate is added. When the first acid is stirred, it is preferred that the first acid is stirred from 30 minutes to 3.50 hours and most preferably from 1.75 to 2.25 hours. It is believed that stirring the first acid after the ammonium sulfate is added allows for greater precipitation of the platinum due to total mixing of ammonium sulfate and the first acid.

The method of regenerating the catalyst preferably includes separating the platinum precipitated with ammonium sulfate from the first acid and the metal dissolved in the first acid. A technique to separate the platinum includes, but is not limited to, filtration. If filtering occurs, the platinum is separated from the metal as a retentate. The metal dissolved in the first acid is a filtrate. The filtrate may be reserved separately from the catalyst. Use of the filtrate is described additionally below.

In another embodiment, the method of regenerating the catalyst may include adding additional ammonium sulfate to rinse the retentate on a filter bed. Preferably, any additional platinum that is precipitated remains on the retentate within the filter bed. It is believed that rinsing the catalyst removes any leftover metal and any acid while maintaining the platinum as the sulfate salt.

The method of regenerating the catalyst also includes optionally adding the platinum that has been precipitated with ammonium sulfate to water to form a suspension. If the platinum is added to the water to form a suspension, it is preferred that the platinum is added to the water after the platinum is separated from the first acid and the metal dissolved in the first acid.

The method of regenerating the catalyst may also include mixing the suspension. Without intending to be bound by theory, it is believed that mixing the suspension breaks up the platinum precipitated with ammonium sulfate and introduces the platinum into solution with the water.

In another embodiment, the suspension may be heated under a nitrogen stream. If heating occurs under the nitrogen stream, it is preferred that the suspension is heated under the nitrogen stream after the catalyst is added to the water. When the suspension is heated, the suspension is preferably heated to from 60 to 100° C. and most preferably to from 80 to 90° C. It is believed that heating the suspension under the nitrogen stream eliminates the possibility of forming oxides, such as $PtO_2$, a possible contaminant of the catalyst.

Alternatively, the method of regenerating the catalyst also includes adding a base to the suspension. If the base is added to the suspension, it is preferred that the base is added to the suspension after the suspension has been heated under the nitrogen stream. If addition to the suspension results, the base preferably includes, but is not limited to, an alkaline metal salt. More preferably, the base includes an alkaline metal salt that is organic. Most preferably, the base includes sodium acetate. Adding the base to the suspension preferably raises a pH of the suspension to from 3.0 to 7.0 and most preferably to from 4.0 to 6.0.

In another embodiment, the method of regenerating the catalyst includes adding a selective poisoning compound to the suspension. Preferably the selective poisoning compound includes, but is not limited to, sulfur, sodium dithionite, and combinations thereof. Most preferably, the selective poisoning compound includes sulfur. If addition of the selective poisoning compound to the suspension occurs, the selective poisoning compound is preferably added after the base is added to the suspension. Also if the selective poisoning compound is added to the suspension, it is preferably added in an amount of from 0.005 to 0.100, more preferably of from 0.010 to 0.050, and most preferably of from 0.020 to 0.040 parts by weight per 100 parts by weight of the platinum. It is believed that the selective poisoning compound is added to the suspension to intentionally selectively poison the catalyst. The catalyst is poisoned with the selective poisoning compound to balance selectivity and yield of the catalyst. An excess of the selective poisoning compound reduces the yield of the catalyst but allows the catalyst to be more highly selective. Conversely, a lack of the selective poisoning compound allows the catalyst to produce high yields but reduces the selectivity of the catalyst towards hydroxylamine. The method of regenerating the catalyst also includes optionally cooling the suspension including the selective poisoning compound. When the suspension is cooled, it is preferred that the suspension is cooled to from 40 to 80° C. and most preferably to from 55 to 70° C.

The method of regenerating the catalyst further includes precipitating the platinum onto the carrier for reuse. The platinum may be precipitated onto the carrier for reuse through the addition of a second acid to the suspension. If addition of the second acid to the suspension occurs, it is preferred that the second acid includes, but is not limited to, an organic acid. Most preferably, the second acid includes formic acid. It is believed that formic acid acts to reduce platinum from an oxidized state to a ground state, thereby causing the platinum to precipitate onto the carrier. Additionally, the selective poisoning compound would also precipitate onto the carrier.

The method of regenerating the catalyst also includes optionally stirring the suspension including the second acid. When the suspension is stirred, the suspension is preferably stirred from 6 to 60 minutes and most preferably from 27 to 33 minutes. In another embodiment, the method of regenerating the catalyst includes heating the suspension including the second acid. If the suspension is heated, the suspension is preferably heated after the suspension is stirred. Also, if the suspension is heated, the suspension is preferably heated to from 60 to 100° C. and most preferably to from 80 to 90° C. It is believed that the optional heating aids in the reduction of the platinum.

Alternatively, the suspension including the second acid may be stirred a second time. If stirring occurs a second time, the suspension is preferably stirred after the suspension has been heated. Also, if the suspension is stirred for a second time, the suspension is preferably stirred from 1.0 to 5.0 hours and most preferably from 2.5 to 3.5 hours.

If the suspension is heated, as described above, the suspension is preferably cooled. However, as described above, heating is optional so that cooling may not be necessary. If the suspension is cooled, the suspension is preferably cooled to from 30 to 70° C. and most preferably to from 40 to 60° C. Finally, the platinum precipitated onto the carrier may be separated from the suspension under the nitrogen stream and may be washed with water. It is believed that the nitrogen stream eliminates the possibility of forming oxides, such as $PtO_2$, a possible contaminant of the catalyst. Also, it is believed that the water will wash away any loose impurities from the catalyst thereby increasing purity of the catalyst.

After separation of the catalyst from the suspension, approximately 91 parts by weights of the platinum are recovered per 100 parts by weight of platinum originally present on the carrier. Further, 61 parts by weight of mercury are removed from the catalyst per 100 parts by weight of mercury originally poisoning the catalyst. Still further, 70 parts by weight of copper are removed from the catalyst per 100 parts by weight of copper originally poisoning the catalyst. Once the catalyst is regenerated and the platinum recovered, the catalyst is suitable for reuse.

After the catalyst is suitable for reuse, the method continues and allows the metal originally poisoning the platinum catalyst to be recovered. The filtrate, as described above, may be utilized to recover the metal originally poisoning the catalyst. A second carrier, which is the same as the first carrier, may be added to the filtrate in small quantities. Any dissolved metal in the filtrate originally poisoning the catalyst may be precipitated onto the second carrier for recovery. If the second carrier is added, it is preferred that the second carrier is added in an amount of from 1.0 to 5.0, more preferably from 1.0 to 4.0, and most preferably from 1.5 to 3.0 parts by weight per 100 parts by weight of the filtrate.

Alternatively, the method of recovering the metal originally poisoning the catalyst may include stirring the filtrate under the nitrogen stream. If stirring under the nitrogen stream is conducted, it is preferred that the filtrate is stirred after the second carrier is added.

In another embodiment, the method of recovering the metal originally poisoning the catalyst includes adding a base to the filtrate and the second carrier. If the base is added to the filtrate, the base is preferably added to the filtrate after the filtrate has been heated to approximately 85° C. under the nitrogen stream. Also if added, the base is preferably selected from the group of organic and inorganic alkaline metal salts and combinations thereof. Most preferably, the base includes sodium carbonate as the inorganic alkaline metal salt and sodium acetate as the organic alkaline metal salt. If both bases are utilized, it is preferred that sodium carbonate is added before the sodium acetate. If the sodium acetate is utilized, it is preferred that the sodium carbonate is added to the filtrate in an amount such that the pH of the filtrate is initially raised to from 0.5 to 3.0 and most preferably raised to from 1.4 to 1.6. Further, if the sodium acetate is utilized, it is preferred that the sodium acetate is added to the filtrate in amount such that the pH of the filtrate is additionally raised to from 3 to 7 and most preferably raised to from 4.0 to 6.0.

The method of recovering the metal originally poisoning the catalyst also includes optionally adding a third acid to the filtrate and the second carrier to reclaim any leftover platinum and recover any metal originally poisoning the catalyst. If the third acid is added to the filtrate, the third acid is preferably added after the base is added to the filtrate. Preferably, the third acid includes, but is not limited to, an organic acid. Most preferably, the third acid includes formic acid. If the third acid is added to the filtrate, it is preferred that the third acid is added to the filtrate in an amount of from 2.0 to 8.0, more preferably from 3.0 to 6.0, and most preferably from 3.0 to 5.0 parts by weight per 100 parts by weight of the total solution. It is believed that adding the third acid to the filtrate functions to reduce any leftover platinum and any metal leftover in the filtrate that originally poisoned the catalyst thereby causing the platinum and the metal to precipitate onto the second carrier. Precipitating the platinum and the metal onto the second carrier allows the metal to be retained on the second carrier and reduces an amount of waste transferred to the environment when the filtrate is discarded.

The method of recovering the metal originally poisoning the catalyst may also include heating the filtrate. If heating the filtrate occurs, the filtrate is preferably heated after the third acid is added to the filtrate. Also, if the filtrate is heated, the filtrate is preferably heated to from 60 to 100° C. and most preferably to from 80 to 90° C. While heating, the filtrate may optionally be stirred. If stirring results, the filtrate is preferably stirred from 1.0 to 5.0 hours and most preferably from 2.5 to 3.5 hours. In other embodiments, the filtrate may be cooled, washed, and/or dried, preferably after heating the filtrate including the third acid.

After separating the second carrier from the filtrate, approximately 1.26 parts by weight of platinum per 100 parts by weight of the second carrier are recovered from the filtrate. Similarly, 0.93 parts by weight of mercury and 0.56 parts by weight of copper per 100 parts by weight of mercury and copper originally poisoning the catalyst are recovered from the filtrate.

Figure 2:
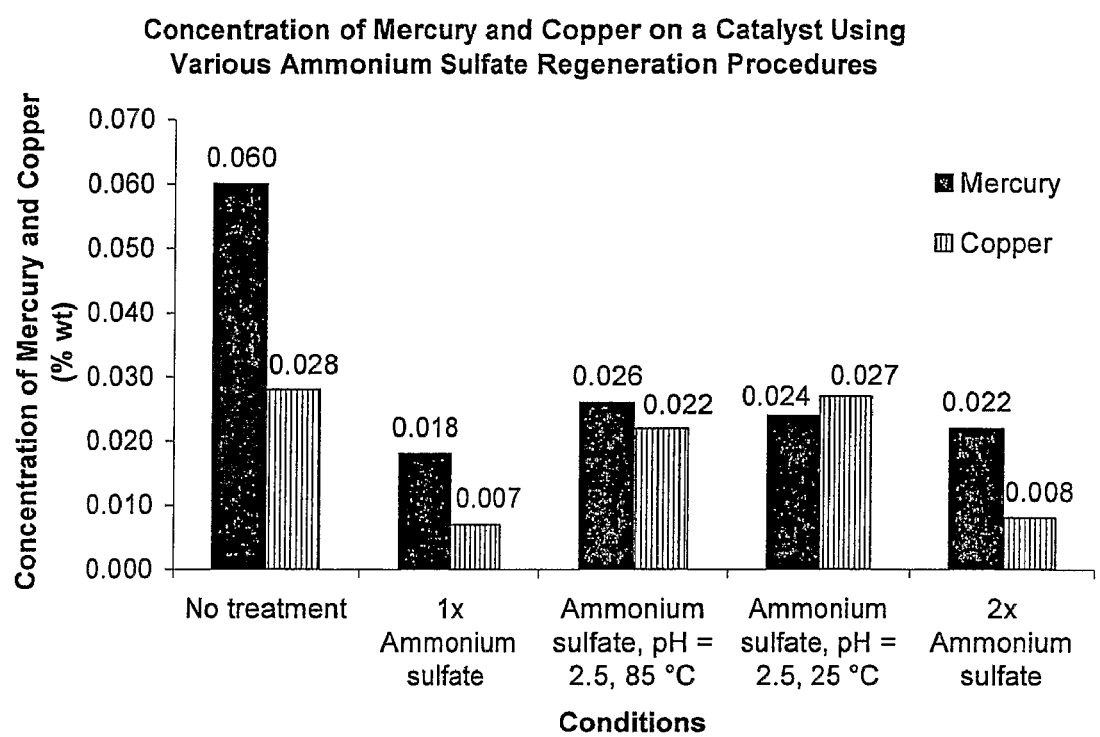
FIG. 2 is a bar graph illustrating concentration of mercury and copper on a catalyst using various ammonium sulfate regeneration procedures.
Figure 3:
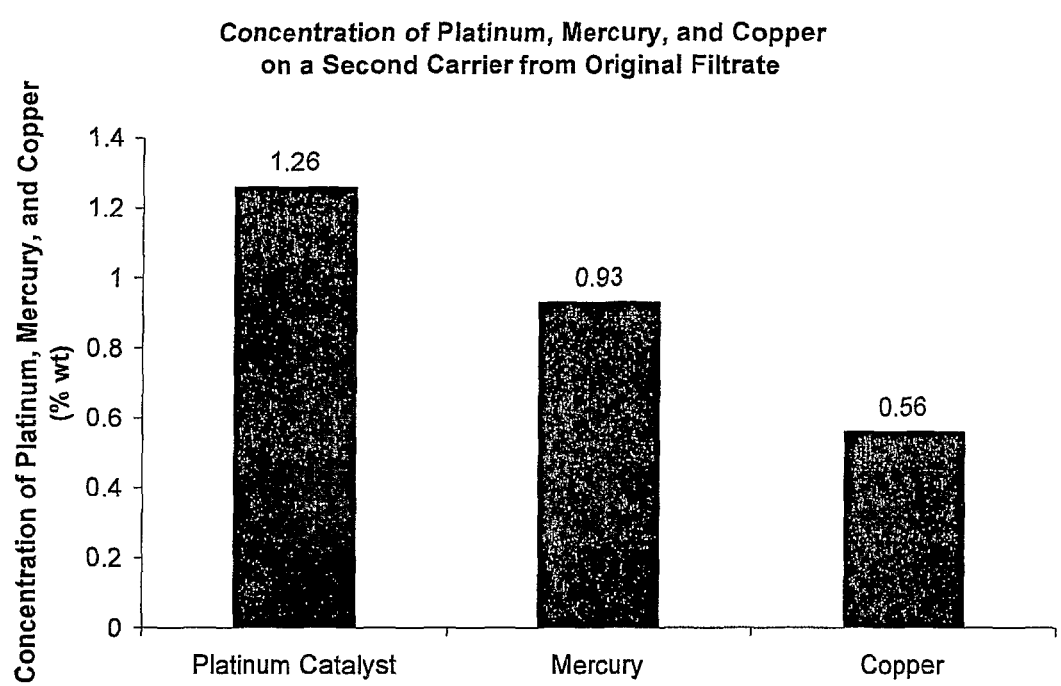
FIG. 3 is a bar graph illustrating concentration of platinum, mercury, and copper on a second carrier from an original filtrate.

Referring now to FIGS. 1-3, the method of regenerating the catalyst and the method of preparing hydroxylammonium salts, according to the present invention, yield multiple advantages. A first advantage includes reducing a loss of the platinum on the carrier, as shown in FIG. 1. A second advantage includes reducing an amount of mercury and copper remaining on the catalyst after regeneration of the catalyst with ammonium sulfate, as shown in FIG. 2. A third advantage includes recovering the metal from the filtrate, as shown in FIG. 3, to reduce an amount of waste transferred to the environment and to reclaim any remaining platinum.

As shown in FIGS. 1 and 2, the terminology "No treatment" indicates that the platinum was not subject to any experimental method change during catalyst regeneration. Also, the terminology "1× ammonium sulfate" indicates that the platinum was dissolved in the first acid, ammonium sulfate was added in equal amounts to the platinum, and the pH of the first acid was not adjusted and was less than one. Further, the terminology "ammonium sulfate, pH=2.5, 85° C." indicates that the platinum was dissolved in the first acid, the pH of the first acid was adjusted to 2.5, the first acid was heated to 85° C., ammonium sulfate was added to the first acid in equal amounts to the platinum, and the first acid was cooled to 25° C. before filtration. Still further, the terminology "ammonium sulfate, pH=2.5, 25° C." indicates that the platinum was dissolved in the first acid, the pH of the first acid was adjusted to 2.5, the first acid was cooled to 25° C., and ammonium sulfate was added to the first acid in equal amounts to the platinum before filtration. Additionally, the terminology "2× ammonium sulfate" indicates that the platinum was dissolved in the first acid, twice the amount of ammonium sulfate to the platinum was added in comparison to the 1× ammonium sulfate condition, and the pH of the first acid was not adjusted.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A method of regenerating a catalyst comprising platinum applied on a carrier wherein the catalyst is at least partially poisoned with a metal as a result of use in preparation of hydroxylammonium salts, said method comprising:
dissolving the platinum and the metal in a first acid;
adding ammonium sulfate to the first acid to precipitate the platinum; and
precipitating the platinum onto the carrier for reuse.

2. The method of regenerating a catalyst as claimed in claim 1, wherein the platinum and the metal are dissolved in at least one mineral acid.

3. The method of regenerating a catalyst as claimed in claim 2, wherein the at least one mineral acid comprises hydrochloric acid and nitric acid.

4. The method of regenerating a catalyst as claimed in claim 1, further comprising separating the platinum precipitated with ammonium sulfate from the first acid and the metal dissolved in the first acid.

5. The method of regenerating a catalyst as claimed in claim 4, wherein the platinum precipitated with ammonium sulfate from the first acid and the metal dissolved in the first acid are separated by filtration.

6. The method of regenerating a catalyst as claimed in claim 4, further comprising the step of precipitating the metal dissolved in the first acid onto a second carrier.

7. The method of regenerating a catalyst as claimed in claim 1, further comprising the step of adding a selective poisoning compound to the first acid after the platinum and the metal have been dissolved in the first acid.

8. The method of regenerating a catalyst as claimed in claim 7, wherein the selective poisoning compound is selected from the group consisting of sulfur, sodium dithionite, and combinations thereof.

9. The method of regenerating a catalyst as claimed in claim 7, wherein the selective poisoning compound comprises sulfur.

10. The method of regenerating a catalyst as claimed in claim 1, wherein precipitating the platinum onto the carrier for reuse comprises adding a second acid to the first acid.

11. The method of regenerating a catalyst as claimed in claim 10, wherein the second acid comprises an organic acid.

12. The method of regenerating a catalyst as claimed in claim 11, wherein the organic acid comprises formic acid.

13. The method of regenerating a catalyst as claimed in claim 1, further comprising adding the platinum that has been precipitated with ammonium sulfate to water to form a suspension.

14. The method of regenerating a catalyst as claimed in claim 13, further comprising mixing the suspension.

15. The method of regenerating a catalyst as claimed in claim 13, further comprising adding a selective poisoning compound to the suspension.

16. The method of regenerating a catalyst as claimed in claim 15, wherein the selective poisoning compound is selected from the group consisting of sulfur, sodium dithionite, and combinations thereof.

17. The method of regenerating a catalyst as claimed in claim 15, wherein the selective poisoning compound comprises sulfur.

18. The method of regenerating a catalyst as claimed in claim 13, further comprising raising a pH of the suspension comprising the platinum precipitated with ammonium sulfate to from 4.0 to 6.0.

19. The method of regenerating a catalyst as claimed in claim 13, wherein precipitating the platinum onto the carrier for reuse comprises adding a second acid to the suspension.

20. The method of regenerating a catalyst as claimed in claim 19, wherein the second acid comprises an organic acid.

21. The method of regenerating a catalyst as claimed in claim 20, wherein the organic acid comprises formic acid.

22. The method of regenerating a catalyst claimed in claim 1, further comprising separating the carrier and the platinum from the first acid after the platinum has been precipitated onto the carrier.

23. A method of regenerating a catalyst comprising platinum applied on a carrier wherein the catalyst is at least partially poisoned with a metal as a result of use in preparation of hydroxylammonium salts, said method comprising:
dissolving the platinum and the metal in a first acid;
adding ammonium sulfate to the first acid to precipitate the platinum;
filtering the platinum precipitated with ammonium sulfate from the first acid and the metal dissolved in the first acid;
adding the platinum that has been precipitated with ammonium sulfate to water to form a suspension;
mixing the suspension;
raising a pH of the suspension to from 4.0 to 6.0;
adding a selective poisoning compound to the suspension; and
precipitating the platinum onto the carrier for reuse.

24. The method of regenerating a catalyst as claimed in claim 23, comprising dissolving the platinum and the metal in hydrochloric acid and nitric acid.

25. The method of regenerating a catalyst as claimed in claim 23, further comprising precipitating the metal dissolved in the first acid onto a second carrier.

26. The method of regenerating a catalyst as claimed in claim 23, wherein the selective poisoning compound is selected from the group consisting of sulfur, sodium dithionite, and combinations thereof.

27. The method of regenerating a catalyst as claimed in claim 23, wherein the step of precipitating the platinum onto the carrier for reuse comprises the step of adding a second acid to the suspension.

28. The method of regenerating a catalyst as claimed in claim 23, further comprising the step of separating the carrier and the platinum from the first acid after the platinum has been precipitated onto the carrier.

* * * * *